(12) United States Patent  
Tsunoda

(10) Patent No.: US 9,180,804 B2
(45) Date of Patent: Nov. 10, 2015

(54) CLIP, CONNECTED CLIP, AND SEAT COVER COVERING STRUCTURE

(75) Inventor: Ryuji Tsunoda, Miyoshi (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 607 days.

(21) Appl. No.: 13/391,525

(22) PCT Filed: Aug. 17, 2010

(86) PCT No.: PCT/JP2010/063884
§ 371 (c)(1),
(2), (4) Date: Mar. 6, 2012

(87) PCT Pub. No.: WO2011/024675
PCT Pub. Date: Mar. 3, 2011

(65) Prior Publication Data
US 2012/0174352 A1    Jul. 12, 2012

(30) Foreign Application Priority Data

Aug. 24, 2009  (JP) ................................. 2009-193710
Sep. 24, 2009  (JP) ................................. 2009-219535

(51) Int. Cl.
| A47C 31/00 | (2006.01) |
| B60N 2/58 | (2006.01) |
| B68G 7/12 | (2006.01) |
| F16B 5/06 | (2006.01) |
| F16B 21/07 | (2006.01) |

(52) U.S. Cl.
CPC ............... B60N 2/5825 (2013.01); B68G 7/12 (2013.01); F16B 5/0642 (2013.01); F16B 21/071 (2013.01); F16B 21/073 (2013.01); Y10T 24/44641 (2015.01)

(58) Field of Classification Search
USPC ........ 297/218.1, 218.2, 218.3, 218.5; 24/306, 24/663, 581.11, 294, 289, 297
See application file for complete search history.

(56) References Cited

U.S. PATENT DOCUMENTS

| 5,826,312 | A  | * | 10/1998 | Schroder et al. ............. 24/601.2 |
| 7,287,305 | B2 | * | 10/2007 | Bednarski ........................ 24/297 |
| 7,506,939 | B2 | * | 3/2009 | Brockschneider et al. 297/452.6 |
| 7,837,263 | B2 | * | 11/2010 | Booth et al. ................ 297/218.1 |
| 8,099,837 | B2 | * | 1/2012 | Santin et al. ..................... 24/297 |
| 8,316,513 | B2 | * | 11/2012 | DeJong et al. .................. 24/293 |
| 8,474,111 | B2 | * | 7/2013 | Ribes Marti .................... 24/458 |

(Continued)

FOREIGN PATENT DOCUMENTS

DE      4219656 C1    12/1992
EP      1243462 A2    9/2002

(Continued)

OTHER PUBLICATIONS

China Patent Office, "Office Action for CN 201080037492.1," Feb. 8, 2014.

*Primary Examiner* — David R Dunn
*Assistant Examiner* — Alexander Harrison
(74) *Attorney, Agent, or Firm* — Manabu Kanesaka

(57) ABSTRACT

Slits (36) are formed on a wall part (28) of a clip (16), and a locking piece (34) is made elastically deformable. Only the locking piece (34) is elastically deformed outward when a suspender (22) is locked in the locking piece (34). The locking piece (34) is restored when an upper face (22A) of the suspender (22) passes a top part of a locking claw (38) of the locking piece (34). The suspender (22) is thus prevented from coming out, and the suspender (22) is locked in the clip (16).

15 Claims, 21 Drawing Sheets

(56) References Cited

U.S. PATENT DOCUMENTS

| | | | |
|---|---|---|---|
| D708,044 S * | 7/2014 | Komeno et al. | D8/356 |
| 2004/0093701 A1* | 5/2004 | Dickinson et al. | 24/294 |
| 2004/0111841 A1* | 6/2004 | Osterland et al. | 24/294 |
| 2005/0155191 A1* | 7/2005 | Asano et al. | 24/297 |
| 2005/0217082 A1* | 10/2005 | Vassiliou | 24/294 |
| 2007/0257531 A1* | 11/2007 | Mashimo | 297/218.3 |
| 2009/0165263 A1* | 7/2009 | Smith | 24/297 |
| 2009/0188086 A1* | 7/2009 | Okada et al. | 24/297 |
| 2010/0088860 A1* | 4/2010 | Benedetti et al. | 24/297 |

FOREIGN PATENT DOCUMENTS

| | | |
|---|---|---|
| JP | H06-45600 U | 6/1994 |
| JP | 2002-039130 A | 2/2002 |
| WO | 01/24665 A1 | 4/2001 |
| WO | 2007/008662 A2 | 1/2007 |

* cited by examiner

CLIP, CONNECTED CLIP, AND SEAT COVER COVERING STRUCTURE

RELATED APPLICATIONS

The present application is National Phase of International Application No. PCT/JP2010/063884 filed Aug. 17, 2010, and claims priority from Japanese Applications No. 2009-193710, filed Aug. 24, 2009 and No. 2009-219535, Sep. 24, 2009.

TECHNOLOGICAL FIELD

The present invention relates to a clip, connected clip, and seat cover covering structure for covering with a seat cover.

BACKGROUND TECHNOLOGY

A seat cover is integrally installed on the surface of an automobile seat. For example, in Patent documents 1 and 2, a clip having a flat board-form base part, a pair of wall parts placed upright from the base part, and claw parts on inner faces of the wall parts, is embedded in a seat, and an anchoring member attached to the seat cover is locked in the claw parts, whereby the seat cover is installed on the seat.

PRIOR ART DOCUMENTS

Patent document 1: EP Publication No. 176996781
Patent document 2: U.S. Publication No. 6899399B2

OUTLINE OF THE INVENTION

Problems to be Solved by the Invention

In consideration of the above circumstances, the object of the present invention is to provide a clip, a connected clip, and a seat cover covering structure, in which deformation of the wall parts is prevented, at least the insertability or operability of the anchoring member is favorable, and the stability of the anchoring member is assured.

Means for Solving the Problems

A first aspect of the present invention provides a clip, comprising a board-form base part held on a foamed material; a pair of oppositely facing wall parts placed upright from the base part; a locking part provided elastically deformably toward the outside of the wall part by forming slits on the wall part; and a locking claw projecting from an inner face of the locking part, for locking an anchoring member attached to a seat cover covering the foamed material and inserted between the wall parts.

In the abovementioned aspect, the pair of oppositely facing wall parts is placed upright from the board-form base part held on the foamed material. Slits are formed on the wall part, and the locking part is provided elastically deformably toward the outside of the wall part. The locking claw projects from the inner face of the locking part, and only the locking part is elastically deformed outward when the anchoring member attached to the seat cover covering the foamed material is inserted between the wall parts. The locking part returns when the anchoring member passes the locking claw, and the anchoring member is prevented from coming out by the locking claw and is locked in the clip.

Thus, because only the locking part is elastically deformed when the anchoring member is locked by the locking claw, the insertion force of the anchoring member may be smaller compared with the case when the entirety of the wall part on which the locking part is provided is elastically deformed. In other words, the insertability of the anchoring member is favorable and the operability is favorable. Also, because the insertion force of the anchoring member is small, deformation or breakage of the wall part due to insertion of the anchoring member can be prevented, and the stability of the anchoring member can be assured in the state in which the anchoring member is locked by the locking claw.

A second aspect of the present invention according to the first aspect of the present invention is the shape of a space formed by an inner face of the wall part and end face of the locking claw, which may be the same as the external shape of the anchoring member.

In the abovementioned configuration, the external shape of the anchoring member is made the same shape as the shape of the space formed by the inner face of the wall part and the end face of the locking claw, whereby rattling of the anchoring member can be suppressed in the state in which the anchoring member is received inside the space, and the stability of the anchoring member can be assured. Therefore, shifting of the seat cover against the foamed material can be prevented.

Also, because the anchoring member moves while being guided on the inner face of the wall part in the process in which the anchoring member is received inside the space, there is little shifting of the anchoring member against the clip during insertion of the anchoring member. Therefore, a so-called "semi-fitted fitted state of the anchoring member," in which the anchoring member is locked in a tilted state in the clip, can be prevented.

A third aspect of the present invention according to the first aspect of the present invention is a pointed part, which may be provided on an outer face of the locking part.

In the abovementioned configuration, the pointed part is provided on the outer face of the locking part, whereby the pointed part digs into the foamed material when the anchoring member is locked by the locking claw, whereby it is made so that the insertion force when the anchoring member passes the locking claw is not increased.

A fourth aspect of the present invention according to the first aspect of the present invention is a protruding part, which may be formed on the inner face of the wall part, being aligned with the position of the end face of the locking claw.

In the abovementioned configuration, the protruding part is formed on the inner face of the wall part, being aligned with the position of the end face of the locking claw, whereby the anchoring member is guided by the locking claw and the protruding part in the process in which the anchoring member is received inside the space formed by the inner face of the wall part and the end face of the locking claw. Therefore, a so-called "semi-fitted fitted state of the anchoring member," in which the anchoring member is locked in a tilted state in the clip, can be prevented. Also, the seating of the anchoring member is favorable, because the anchoring member is prevented from coming out across the entirety of the width direction of the wall part by the locking claw and the protruding part in the state in which the anchoring member is received inside the space.

A fifth aspect of the present invention according to the first aspect of the present invention is two or more hole parts to insert the foamed material, which may be formed on the base part.

In the abovementioned configuration, two or more hole parts to insert the foamed material are provided on the base part, whereby the clip can be anchored to the foamed material when the clip and the foamed material are integrally molded.

A sixth aspect of the present invention according to the first aspect of the present invention is an R part, which may be provided on a base portion of the wall part.

In the abovementioned configuration, the R part is provided on the base portion of the wall part, whereby the wall part is reinforced, and cracking caused on the base portion of the wall part can be prevented.

A seventh aspect of the present invention according to the first aspect of the present invention may comprise a coupling-receiving part provided on the base part; and a coupling part provided on the wall part, to be coupled with the coupling-receiving part.

In the abovementioned configuration, the coupling-receiving part is provided on the base part, the coupling part coupling with the coupling-receiving part is provided on the wall part, and the coupling part is coupled with the coupling-receiving part, whereby the wall part side is integrated with the base part side. Thus, the base part side and the wall part side are formed separately, whereby the universality is increased because it is possible to change only the wall part side to fit the shape of the anchoring member.

An eighth aspect of the present invention according to the first aspect of the present invention is a plurality of projecting parts, which may be placed upright on outer edges of the base part.

In the abovementioned configuration, the plurality of projecting parts is placed upright on the outer edge side of the base part. Although the base part is held on the foamed material, the projecting parts are provided on the base part, whereby the area of contact with the foamed material can be increased, and a load for separation of the foamed material can be increased. Also, the base part is elastically deformed following deformation of the clip and the foamed material during separation of the clip from the foamed material, and separation of the clip from the foamed material can be prevented by an anchoring effect of the projecting parts against the direction of removal of the anchoring member.

A ninth aspect of the present invention provides a connected clip, wherein the clip of the first aspect of the present invention is provided on a board-form member or a linear-form member.

In the abovementioned aspect, the clip is provided on the board-form member or linear-form member. Although the clip must be anchored inside a mold when the clip and the foamed material are integrally molded, a plurality of clips can be connected by the board-form member or linear-form member, for example, by providing the clips on both ends of the board-form member or linear-form member, or on both ends and the center portion of the board-form member or linear-form member. Therefore, the operability is more favorable compared with the case when each clip is anchored inside the mold.

A tenth aspect of the present invention according to the ninth aspect of the present invention is the clip, which may be provided on one end of the board-form member or the linear-form member, and a connecting part for mutually connecting with another board-form member or linear-form member, which may be provided on another end of the board-form member or linear-form member.

In the abovementioned configuration, the clip is provided on one end of the board-form member or linear-form member, and the connecting part for mutually connecting with another board-form member or linear-form member is provided on another end of the board-form member or linear-form member, whereby the board-form members or linear-form members can be mutually connected, and a plurality of clips can be connected by way of the board-form members or linear-form members.

An eleventh aspect of the present invention provides a seat cover covering structure, comprising the clip of the first aspect of the present invention embedded in a foamed material; an anchoring member to be inserted between the wall parts of the clip, having the same shape as the shape of a space formed by an inner face of the wall part and an end face of the locking claw; and a connecting member for connecting the seat cover with the anchoring member.

In the abovementioned aspect, the anchoring member inserted between the wall parts of the clip has the same shape as the shape of the space formed by the inner face of the wall part and the end face of the locking claw. Therefore, rattling of the anchoring member can be suppressed in the state in which the anchoring member is received inside the space, and the stability of the anchoring member can be assured. Accordingly, shifting of the seat cover against the foamed material can be prevented.

Also, because the anchoring member moves while being guided on the inner face of the wall part in the process in which the anchoring member is received inside the space, there is little shifting of the anchoring member against the clip during insertion of the anchoring member. Therefore, a so-called "semi-fitted fitted state of the anchoring member," in which the anchoring member is locked in a tilted state in the clip, can be prevented.

A twelfth aspect of the present invention provides a seat cover covering structure comprising the connected clip of the ninth aspect of the present invention embedded in a foamed material; an anchoring member to be inserted between the wall parts of the clip, having the same shape as the shape of a space formed by an inner face of the wall part and an end face of the locking claw; and a connecting member for connecting the seat cover with the anchoring member.

In the abovementioned aspect, the anchoring member inserted between the wall parts of the clip has the same shape as the space formed by the inner face of the wall part and the end face of the claw part. Therefore, the same effect as that of the invention according to claim 11 can be obtained.

A thirteenth aspect of the present invention according to the eleventh aspect of the present invention is the anchoring member and the connecting member, which may be integrally molded with resin.

In the abovementioned aspect, the anchoring member and the connecting member are integrally molded with resin, whereby an adhering operation, or the like, for integrating the anchoring member and the connecting member becomes unnecessary, and the cost can be reduced.

A fourteenth aspect of the present invention according to the twelfth aspect of the present invention is the anchoring member and the connecting member, which may be integrally molded with resin.

In the abovementioned aspect, the anchoring member and the connecting member are integrally molded with resin, whereby an adhering operation, or the like, for integrating the anchoring member and the connecting member becomes unnecessary, and the cost can be reduced.

Effect of the Invention

Because the present invention has the abovementioned configuration, deformation of the wall parts is prevented, at least the insertability or operability of the anchoring member is favorable, and the stability of the anchoring member is assured.

BRIEF DESCRIPTION OF THE DRAWINGS

FIGS. 17A and 17B are partial cross-sectional views illustrating a first modified example of the clip according to the present embodiment, wherein FIG. 17A illustrates the state before the wall part side is coupled to the base part side, and FIG. 17B illustrates the state in which the wall part side is coupled to the base part side.

FIG. 22A and FIG. 22B are a second modified example of the clip, and a modified example of the suspender, according to the present embodiment, wherein FIG. 22A is a perspective view illustrating the state before the suspender is locked in the clip, and FIG. 22B is a front view illustrating the state in which the suspender is locked in the clip.

EMBODIMENTS OF THE INVENTION

The clips according to the present embodiments are described below with reference to the drawings.

Figure 6:
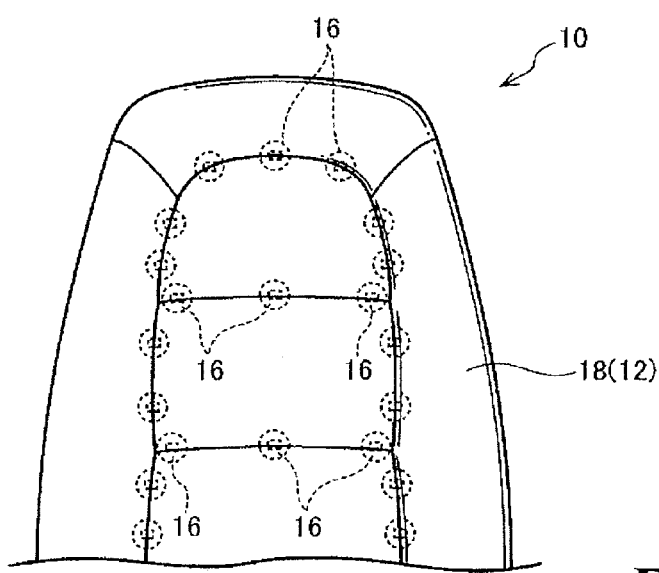
FIG. 6 is a front view of a seat back in which the connected clip according to the present embodiment is embedded.

As illustrated in FIG. 6, an automobile seat (foamed material) 10 has a seat back (foamed material) 12 for supporting a passenger's back and a seat cushion (not illustrated) for a passenger to sit on, and the seat back 12 and seat cushion are formed with a foamed material of polyurethane, or the like. A clip 16 made with resin is embedded inside seat back 12 and seat cushion.

Figure 5:
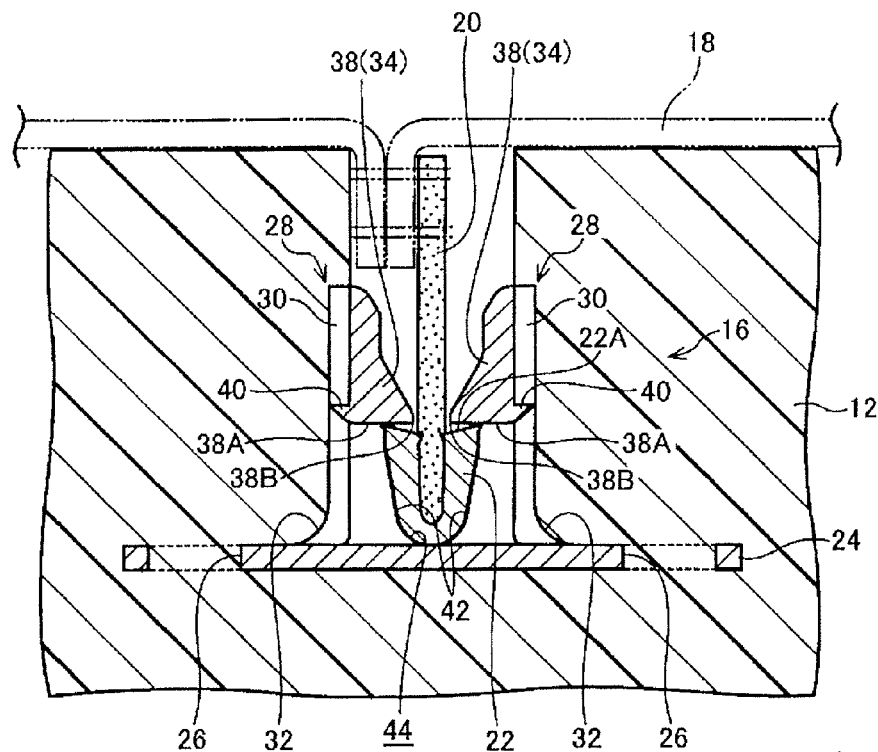
FIG. 5 is a cross-sectional view of the clip and suspender according to the present embodiment illustrating the state in which the suspender is locked in the clip.

Also, as illustrated in FIG. 5, the surfaces of the seat back 12 and seat cushion are covered by a seat cover 18 formed with natural rubber, synthetic rubber, or the like, coated with a resin coating of urethane, or the like. A cloth strap (connecting member) 20 formed with natural fiber, synthetic fiber, or the like, constituting an anchoring member is sewn on the underside of the seat cover 18. A suspender (anchoring member) 22 made with resin, having a triangular shape in section, is provided on the leading end of the cloth strap 20.

The suspender 22 is made to be lockable in the clip 16 embedded in the seat back 12 and seat cushion, and the seat cover 18 is placed to cover the surfaces of the seat back 12 and seat cushion in an anchored state by way of the cloth strap 20 in a state in which the suspender 22 is locked in the clip 16.

(Configuration of the Clip)

The configuration of the clip 16 is described here with reference to FIGS. 1 to 5. Here, for convenience of the description, the top and bottom (indicated by UP and DOWN) of the clip 16 are set with reference to the direction illustrated in FIG. 1, and the description is given accordingly.

Figure 1:
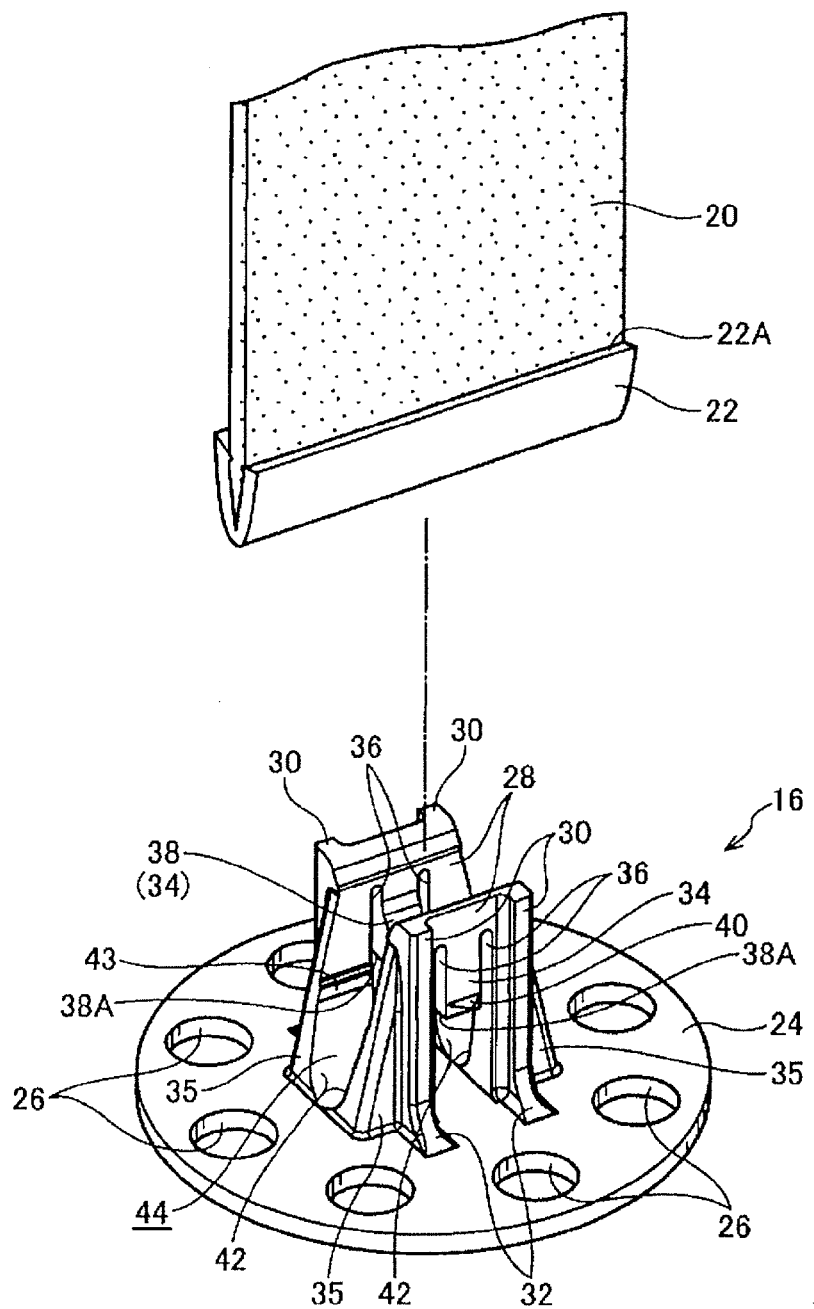
FIG. 1 is a perspective view of the clip and suspender according to the present embodiment.

As illustrated in FIG. 1, the clip 16 is provided with a disk-form base part 24. A plurality of (here, eight) round holes (hole parts) 26 is formed at an equal spacing along the circumferential direction of the base part 24 on the outer edge side of the base part 24.

A pair of wall parts 28 is placed upright from the center portion of the base part 24, and reinforcing ribs 30 are formed along the upright direction of the wall part 28 on both sides of the width direction of the wall part 28. The wall part 28 is reinforced by the reinforcing ribs 30. Also, an R part 32 is provided on the base portion of the reinforcing rib 30 at the boundary with the base part 24, so that cracking caused on the base portion of the wall part 28 is prevented and the wall part 28 is reinforced.

Also, triangular ribs 35 are provided on both ends of the width direction of the wall part 28 in a manner so that the wall part 28 gradually becomes wider going from the leading end to the base portion of the wall part 28, so that the wall part 28 is reinforced together with the reinforcing ribs 30, and so that an area of contact with a suspender 22 to be described is increased and seating of the suspender 22 is improved.

Figure 2:
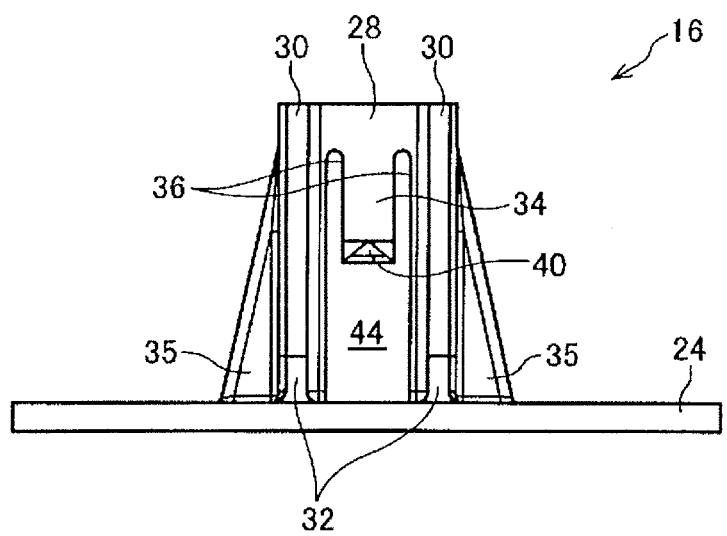
FIG. 2 is a side view of the clip according to the present embodiment.

As illustrated in FIG. 2, the center lower portion of the width direction of the wall part 28 is punched, and a locking piece (locking part) 34 hanging down from the center portion of the leading end of the wall part 28 is provided on the center upper portion of the width direction of the wall part 28. Slits 36 are formed between the locking piece 34 and the reinforcing ribs 30, and the locking piece 34 is made elastically deformable.

Figure 3:
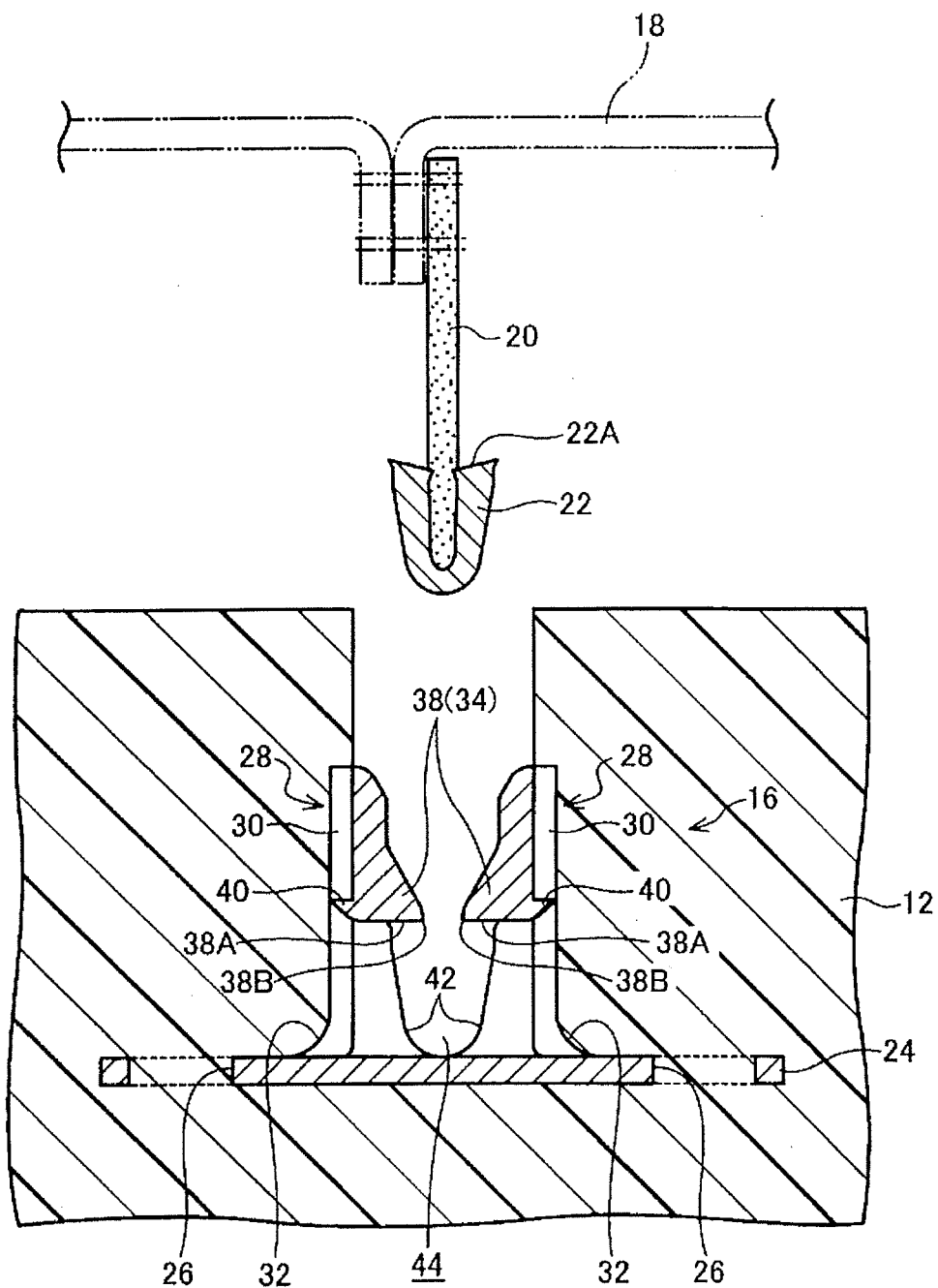
FIG. 3 is a cross-sectional view of the clip and suspender according to the present embodiment illustrating the state before the suspender is locked in the clip.

As illustrated in FIG. 3, a triangular-shaped locking claw 38 projecting from an inner face of the wall part 28 is formed across roughly the entire area of the direction of hanging down of the locking piece 34 in the inner face side of the locking piece 34, and a lower face 38A of the locking claw 38 is formed roughly parallel to the base part 24. Also, a pointed part 40 having a leading end formed to an acute angle projects on a free end side on an outer face side of the locking piece 34. Also, the pointed part 40 has an amount of projection that does not project from an outer face of the reinforcing rib 30.

Also, a guide surface 42 gradually approaching the oppositely facing wall part 28 while going toward the base portion of the wall part 28 is formed on the inner face of the wall part 28, and the suspender 22 is made insertable between wall part 28 and wall part 28. Also, a protruding part 43 projects in parallel to the base part 24 at a position roughly the same height as the position of the lower face 38A of the locking claw 38 in the center portion of the inner face of the wall part 28.

Here, the suspender 22 is provided on the leading end of the cloth strap 20 as previously described, and the suspender 22 formed by extrusion molding is welded on the leading end of the cloth strap 20 so that the cloth strap 20 and the suspender 22 are integrated.

Figure 7:
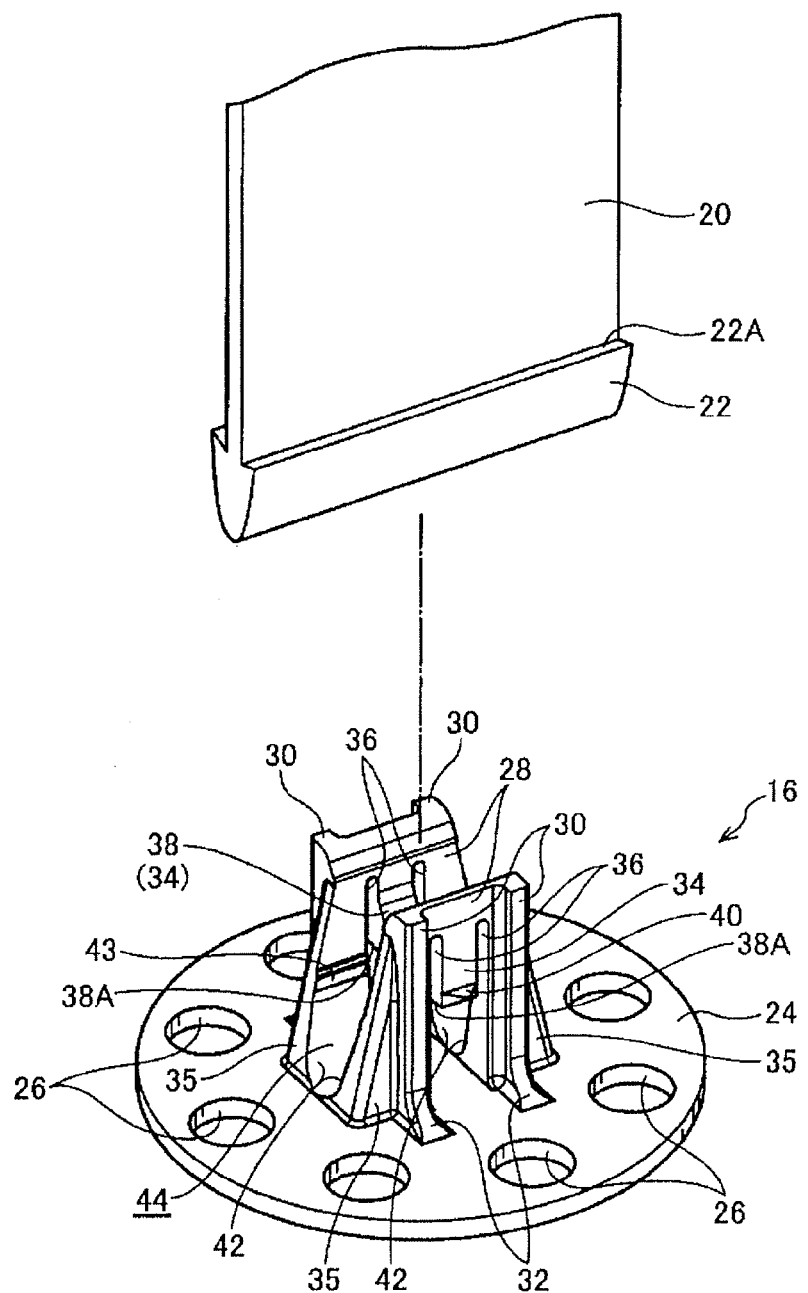
FIG. 7 is a perspective view illustrating a first modified example of the clip and suspender according to the present embodiment.

Here, although the cloth strap 20 and the suspender 22 are integrated by welding, the cloth strap 20 and the suspender 22 may be integrated by two-color extrusion molding. Also, as illustrated in FIG. 7, the cloth strap 20 may be formed with resin, and the suspender 22 may be integrally molded. Thus, the cloth strap 20 and the suspender 22 are integrally molded with resin, whereby an adhering operation, or the like, for integrating the cloth strap 20 and the suspender 22 becomes unnecessary, and the cost can be reduced.

Meanwhile, although the suspender 22 has a roughly triangular shape as previously described, the shape of the space 44 formed between the guide surfaces 42 of the wall parts 28 of the clip 16 and the lower faces (end faces) 38A of the locking claws 38 of the locking pieces 34, and the external shape of the suspender 22 are made to have roughly the same shape.

As illustrated in FIG. 2, the locking pieces 34 are spread outward by the suspender 22 when the suspender 22 is inserted between the wall parts 28, the suspender 22 rides past the protruding part 43 formed on the inner face of the wall part 28, then moves inside the space 44, and at that time moves along the guide surface 42.

Also, as illustrated in FIG. 5, the locking pieces 34 return when the upper face 22A of the suspender 22 passes the top part 38B of the locking claw 38 of the locking piece 34. Thus, the suspender 22 is preventing from coming out in a state in which the locking piece 34 has returned, and is received inside the space 44 in a state being held by the locking piece 34, protruding part 43, and guide surface 42.

The protruding part 43 only projects slightly from the inner face of the wall part 28, and is used for improving the seating of the suspender 22 in a state in which the suspender 22 is held inside the space 44, but the protruding part 43 is not always necessary.

(Operation and Effects of the Clip)

The operation and effects of the clip 16 according to the present embodiment are next described.

Figure 4:
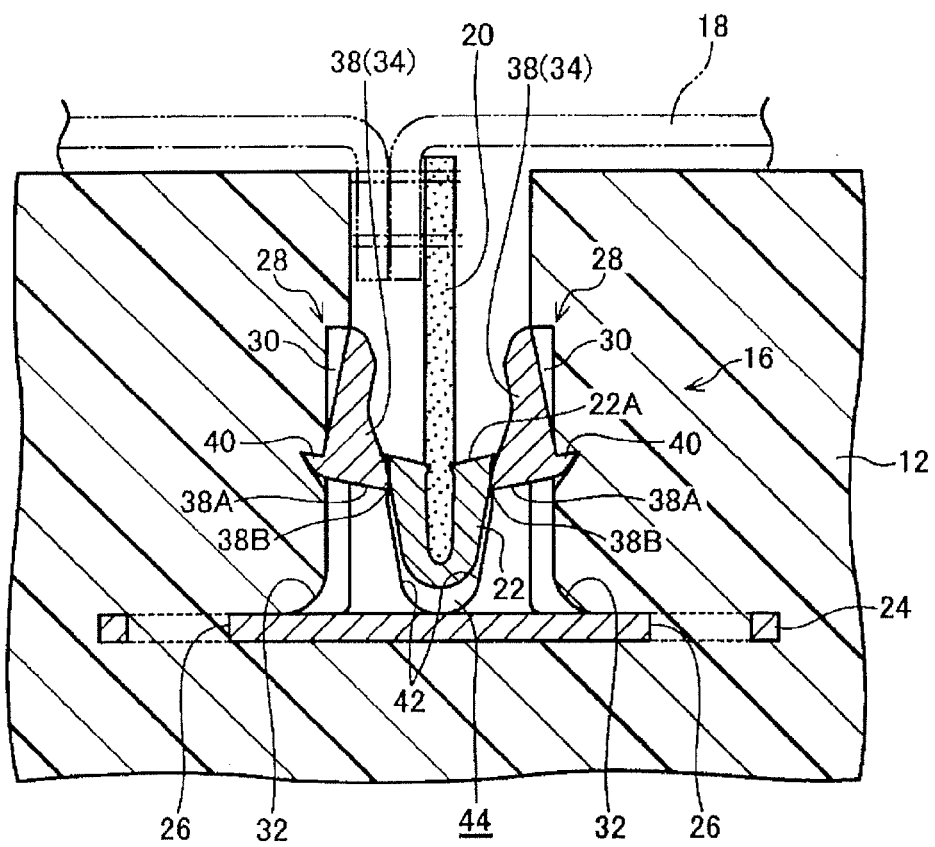
FIG. 4 is a cross-sectional view of the clip and suspender according to the present embodiment illustrating the state in midcourse of locking of the suspender in the clip.

In the present embodiment, as illustrated in FIGS. 1 and 2, slits 36 are formed on the wall part 28 of the clip 16, and the locking piece 34 is made elastically deformable. Also, as illustrated in FIGS. 3 to 5, only the locking piece 34 is elastically deformed outward when the suspender 22 is locked in the locking piece 34, and the locking piece 34 returns when the upper face 22A of the suspender 22 passes the top part 38B of the locking claw 38 of the locking piece 34, so that the suspender 22 is prevented from coming out, and the suspender 22 is locked in the clip 16.

Thus, because only the locking piece 34 is elastically deformed when the suspender 22 is locked, the insertion force of the suspender 22 may be smaller compared with the case when the entirety of the wall part 28 on which the locking piece 34 is provided is elastically deformed. In other words, the insertability of the suspender 22 is favorable and the operability is favorable. Also, because the insertion force of the suspender 22 is small, deformation or breakage of the wall part 28 due to insertion of the suspender 22 can be prevented.

Also, in the present embodiment, as illustrated in FIG. 5, the shape of the space 44 formed between the guide surface 42 of the wall part and the lower face 38A of the locking claw 38 of the locking piece 34 is made as roughly the same shape as the external shape of the suspender 22. By this, rattling of the suspender 22 can be suppressed in the state in which the suspender 22 is received inside the space 44, and the stability of the suspender 22 can be assured. Therefore, shifting of the seat cover 18 against the seat back 12 can be prevented Also, because the suspender 22 past the protruding part 43 formed on the inner face of the wall part 28 and the suspender 22 then moves while being guided by the guide surface 42 provided on the inner face of the wall part 28 in the process in which the suspender 22 is received inside the space 44 of the clip 16, there is little shifting of the suspender 22 against the clip 16 during insertion of the suspender 22. Therefore, a so-called "semi-fitted fitted state of the suspender 22," in which the suspender 22 is locked in a tilted state in the clip 16, can be prevented.

Also, by providing the protruding part 43 on the wall part 28, the suspender 22 is held by the protruding part 43 in a region where the locking piece 34 is not formed on the wall part 28. In other words, the seating of the suspender 22 is favorable, because the suspender 22 is prevented from coming out across the entirety of the width direction of the wall part 28 by the locking piece 34 and the protruding part 43 in the state in which the suspender 22 is received inside the space 44.

Also, a pointed part 40 is provided on an outer face of the locking piece 34. By this, as illustrated in FIG. 4, the pointed part 40 digs into the seat back 12 by elastic deformation of the locking piece 34 when the suspender 22 is locked by the locking piece 34. By this, it is made so that the insertion force when the suspender 22 passes the locking piece 34 is not increased.

Furthermore, a plurality of round holes 26 is formed on the base part 24. By this, the material of the automobile seat 10 is inserted inside the round holes 26 when the clip 16 and the seat back 12 are integrally molded, and therefore the clip 16 can be anchored to the automobile seat 10. Although round holes 26 are punched here, the shape is not limited to round holes 26 (to be described), and punched holes are not always necessary.

(Other Embodiments)

The same reference numerals are assigned here to parts having the same kind of configuration as in the embodiment described above, and their description is omitted.

(1) In the present embodiment, a clip 16 is embedded one at a time in the automobile seat 10 as illustrated in FIGS. 1 and 6, but a connected clip 45 provided with clips 16 on both ends of a band-form member (board-form member) 46

Figure 8:
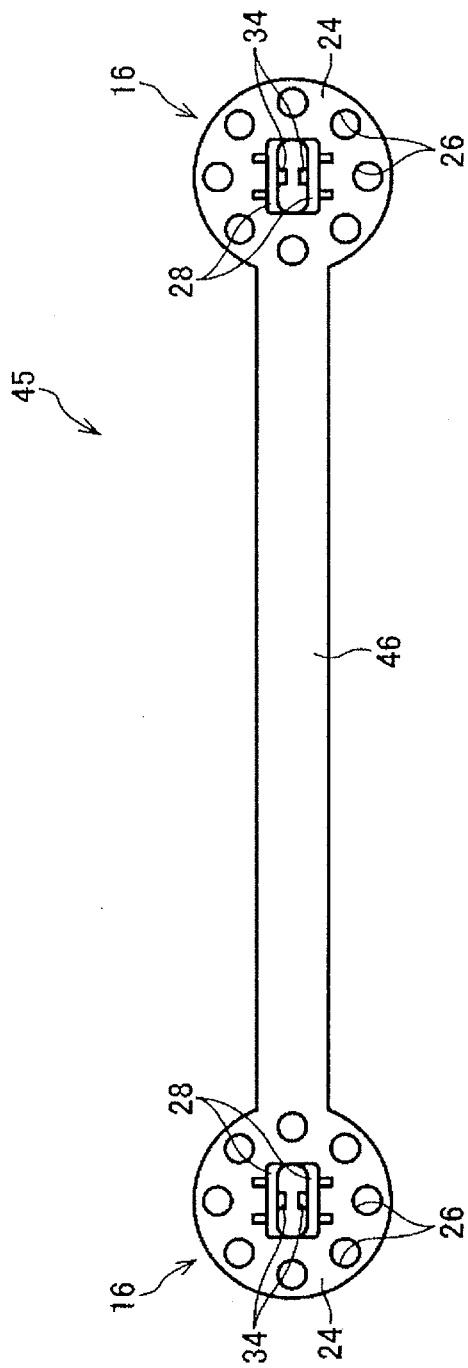
FIG. 8 is a plan view of the connected clip according to the present embodiment.

(may also be a linear form member; here, a linear-form member is a member having a narrower width than a band-form member, and the sectional shape is not particularly limited) may be embedded in the automobile seat 10 using the band-form member 46 as illustrated in FIG. 8.

Figure 9:
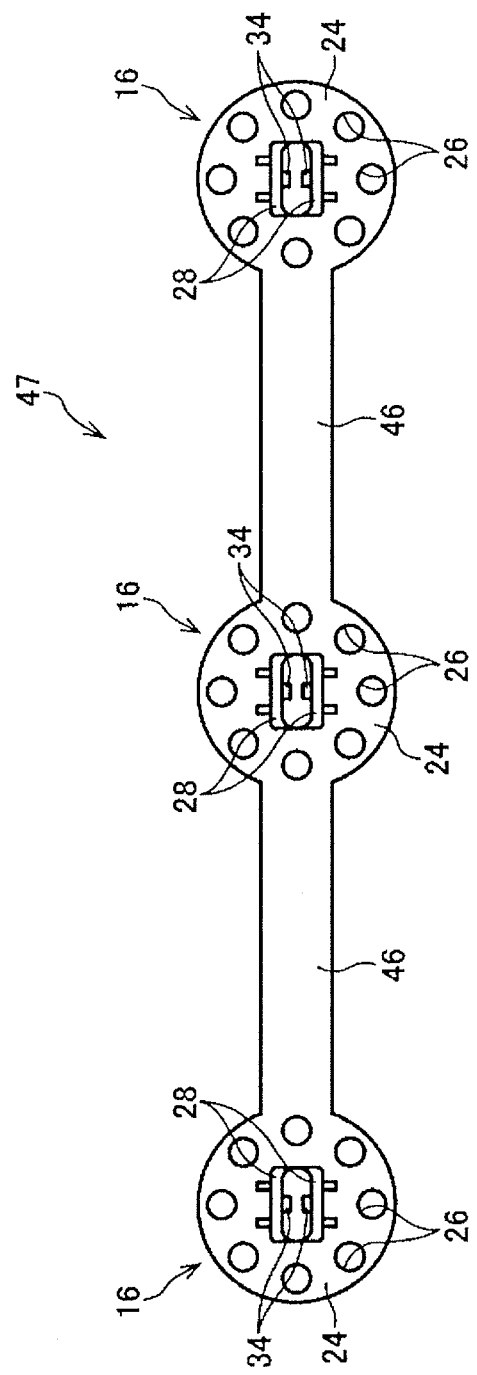
FIG. 9 is a plan view illustrating a first modified example of the connected clip according to the present embodiment.
Figure 10:
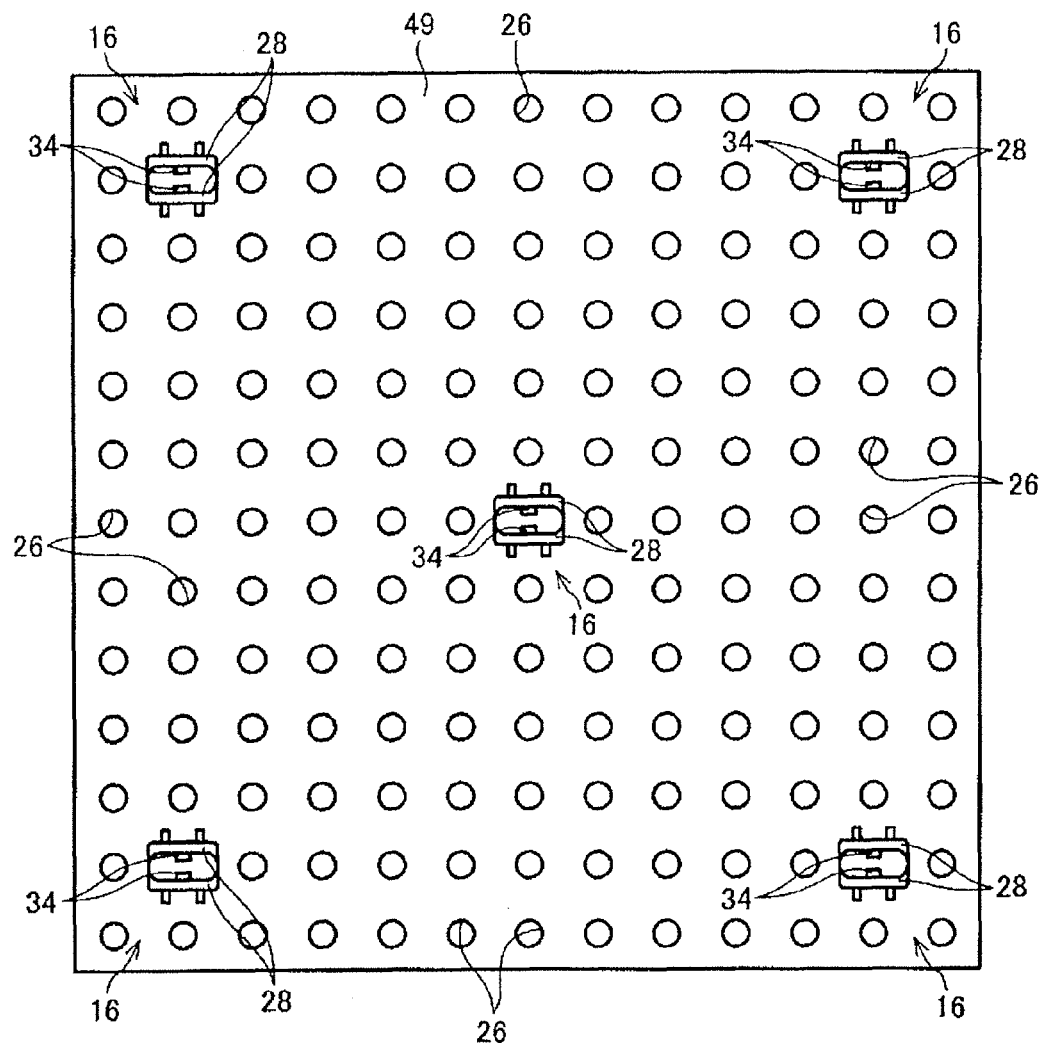
FIG. 10 is a plan view illustrating a second modified example of the connected clip according to the present embodiment.

In this connected clip 45, clips 16 are provided at both ends of a band-form member 46, but the connected clip 47 provided with clips 16 at both ends and in the center portion of a band-form member 46 also may be used as illustrated in FIG. 9. Also, a band-form member 46 was used here as the board-form member, but a roughly square-shaped board-form member 49 may be used, and clips 16 may be provided at four corners and in the center portion of the board-form member 49, as illustrated in FIG. 10.

Figure 11:
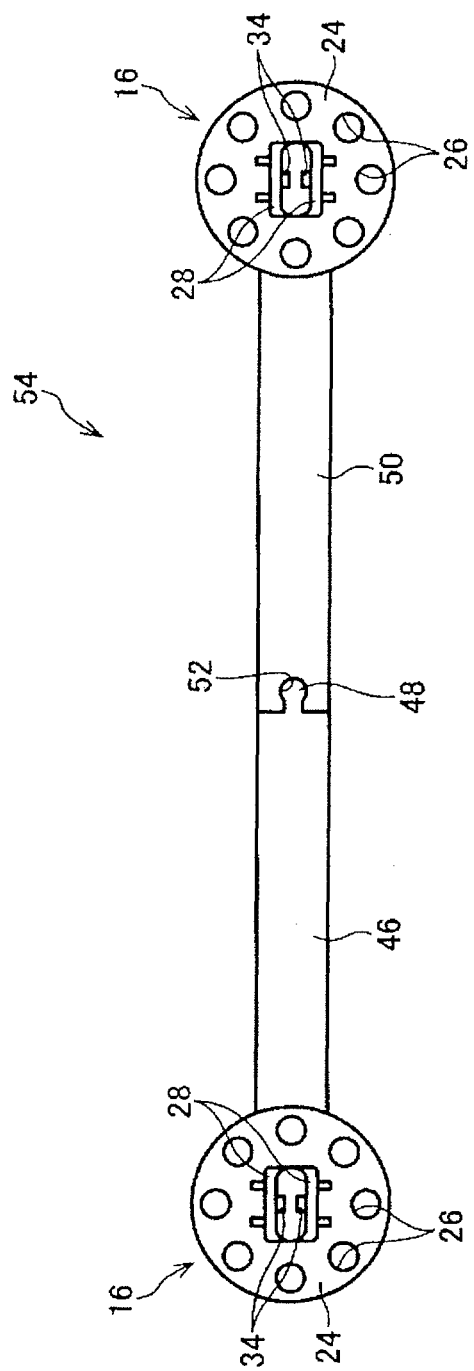
FIG. 11 is a plan view illustrating a third modified example of the connected clip according to the present embodiment.

Also, the connected clip 45 may be such that a band-form member 46 and a plurality of clips 16 are integrally moldable. The connected clip may also be such that clips 16 are integrally provided respectively with band-form members 46 and 50, and the band-form members are connected, as illustrated in FIG. 11.

For example, a connecting part 48 or a connection-accepting part 52 in which a connecting part 48 fits is provided respectively on the leading end of a band-form member 46 or a band-form member 50 extended out from the base part 24 of each clip 16, so that the connecting part 48 and the connection-accepting part 52 can be connected. Here, a roughly circular tab 48A is provided as the connecting part 48, and the base of the tab 48A is made with a narrow width. Meanwhile, a slot 52A in which the tab 48A fits is formed as the connection-accepting part 52, and is formed so that the tab 48A does not easily come out from the slot 52A under tension in a state in which the tab 48A is fitted in the slot 52A.

Figure 12:
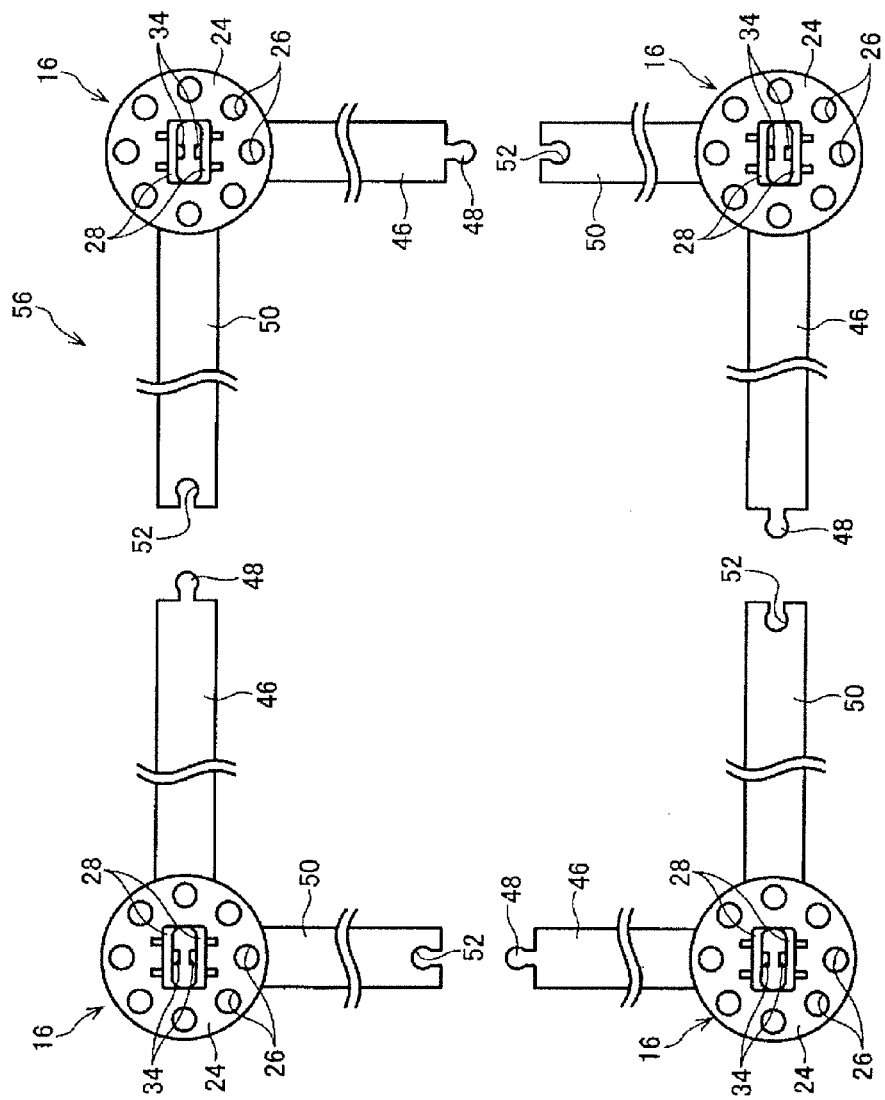
FIG. 12 is a plan view illustrating a fourth modified example of the connected clip according to the present embodiment.

Thus, the connecting part 48 of the band-form member 46 and the connection-accepting part 52 of the band-form member 50 are connected, whereby the connected clips 54 comprising two clips 16 are formed by way of the band-form members 46 and 50. Furthermore, a connected clip 56 comprising a plurality of (here, four) clips 16, in which a plurality of (here, two) band-form members 46 and 50 (here, the where the connecting part 48 is provided is the band-form member 46, and the side where the connection-accepting part 52 is provided is the band-form member 50) are extended from the base part 24 of each clip 16 and are mutually connected, may be used as illustrated in FIG. 12.

Although the roughly circular tab 48A is provided here as the connecting part 48 and the slot 52A in which the tab 48A fits is formed as the connection-accepting part 52, the shape is not particularly limited as long as the connecting part 48 and the connection-accepting part 52 can be mutually connected and the configuration cannot be easily disconnected by an external force.

Figure 13:
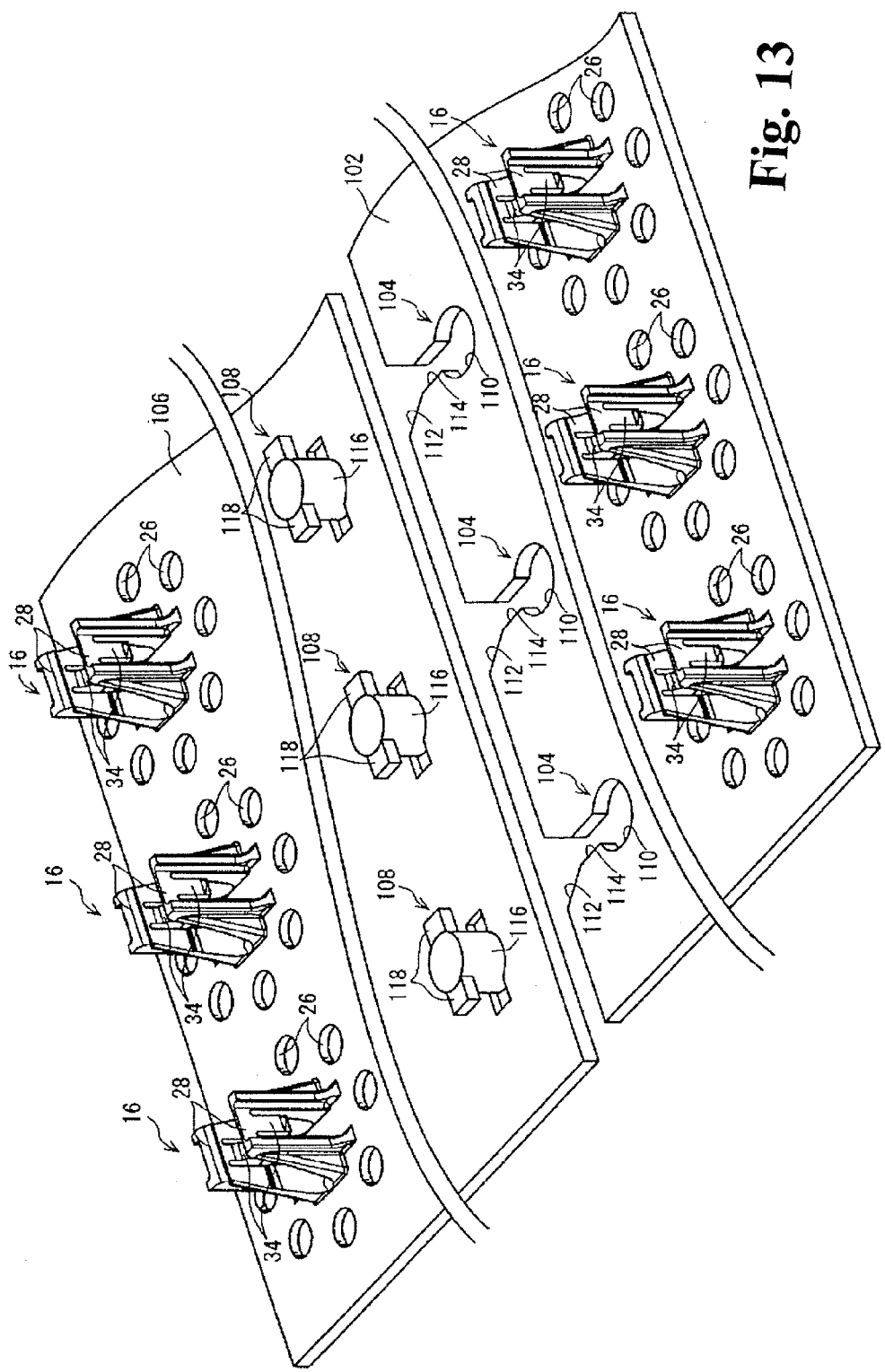
FIG. 13 is a perspective view illustrating a fifth modified example of the connected clip according to the present embodiment.

Also, a plurality of clips may be provided along the width direction of the band-form member and may be made mutually connectable. For example, a plurality of clips 16 is provided along the width direction of a band-form member 102 on one end of the band-form member 102, and a connecting part 104 is provided along the width direction of the band-form member 102 on another end of the band-form member 102, as illustrated in FIG. 13. Meanwhile, a plurality of clips 16 is provided along the width direction of a band-form member 106 on one end of the band-form member 106, in the same manner as with the band-form member 102, and a connection-accepting part 108 to be connected with the connecting part 104 is provided on another end of the band-form member 106.

Also, the connecting part 104 is formed by being cut out from the end face of the band-form member 102, and a circular part 110 is formed in the inner recess of the connecting part 104. An entrance 112 of the circular part 110 is made with a wide width, and a guide portion 114 guiding from the entrance 112 to the circular part 110 is made with a narrow width.

Meanwhile, the connection-accepting part 108 has a boss 116 placed upright from the upper face (the side where the clip 16 is provided) on another end side of the band-form member 106, and the external dimensions of the boss 116 formed on the connecting part 104 are made somewhat smaller than the circular part 110 and roughly the same as the width dimension of the guide portion 114. By this, the boss 116 snaps in when passing through the guide portion 114, so that the band-form member 102 and the band-form member 106 are integrated in a manner so that the boss 116 does not easily come out from the circular part 110.

Also, a pair of flange parts 118 extends from the end face of the boss 116 from the outer perimeter face of the boss 116, a gap between the flange parts 118 and the upper face of the band-form member 106 is made roughly the same as the thickness of the band-form member 102, and another end of the band-form member 102 is held between the flange parts 118 and the upper face of the band-form member 106 in the state in which the boss 116 is inserted inside the circular part 110.

Here, the connecting part 104 and connection-accepting part 108 are provided respectively on the band-form members 102 and 106 along the width directions of the band-form members 102 and 106. Therefore, rotation of the band-form member 106 against the band-form member 102 can be prevented when connecting the connecting part 104 and the connection-accepting part 104 or when in the connected state.

The number of clips 16 and connecting parts 104 (or connection-accepting parts 108) may be the same or may be different. Also, in the case when three or more clips 16 and connecting parts 104 (or connection-accepting parts 108) are arranged, the pitch of arrangement of the clips 16 or connecting parts 104 may be the same or may be different.

Figure 14:
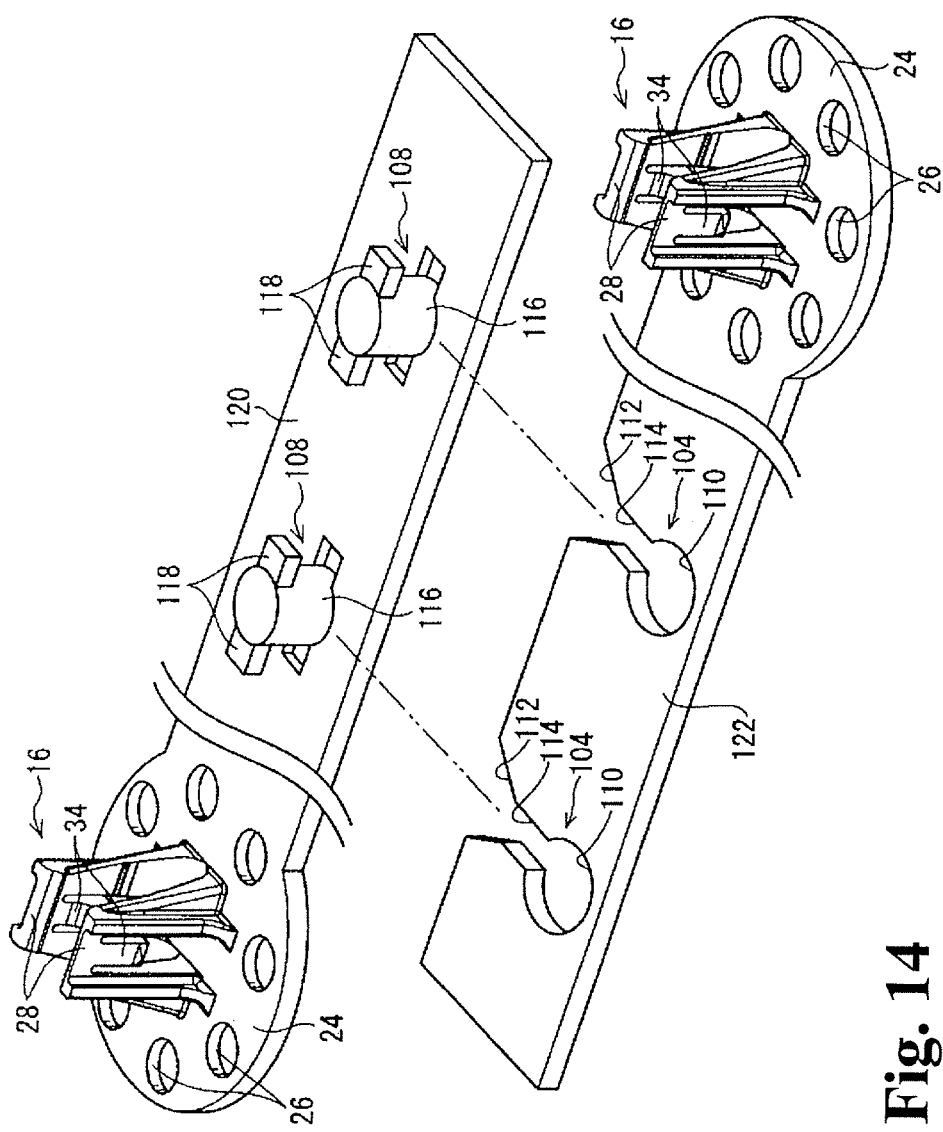
FIG. 14 is a side view illustrating a sixth modified example of the connected clip according to the present embodiment.

Also, a plurality of (here, two) bosses 116 may be provided on another end of a band-form member 120 having a clip 16 on one end, along the length direction of the band-form member 120, and a plurality of (here, two) connecting parts 104, formed by being cut out from a side end face of a band-form member having a clip 16 on one end, may be provided on another end of the band-form member 122, along the length direction of the band-form member 122, as illustrated in FIG. 14. Thus, the plurality of bosses 116 is provided on the band-form member 120 and the plurality of connecting parts 104 is provided on the band-form member 122, and the band-form members are mutually connected, whereby rotation of the band-form member 122 against the band-form member 120 can be prevented.

Figure 15:
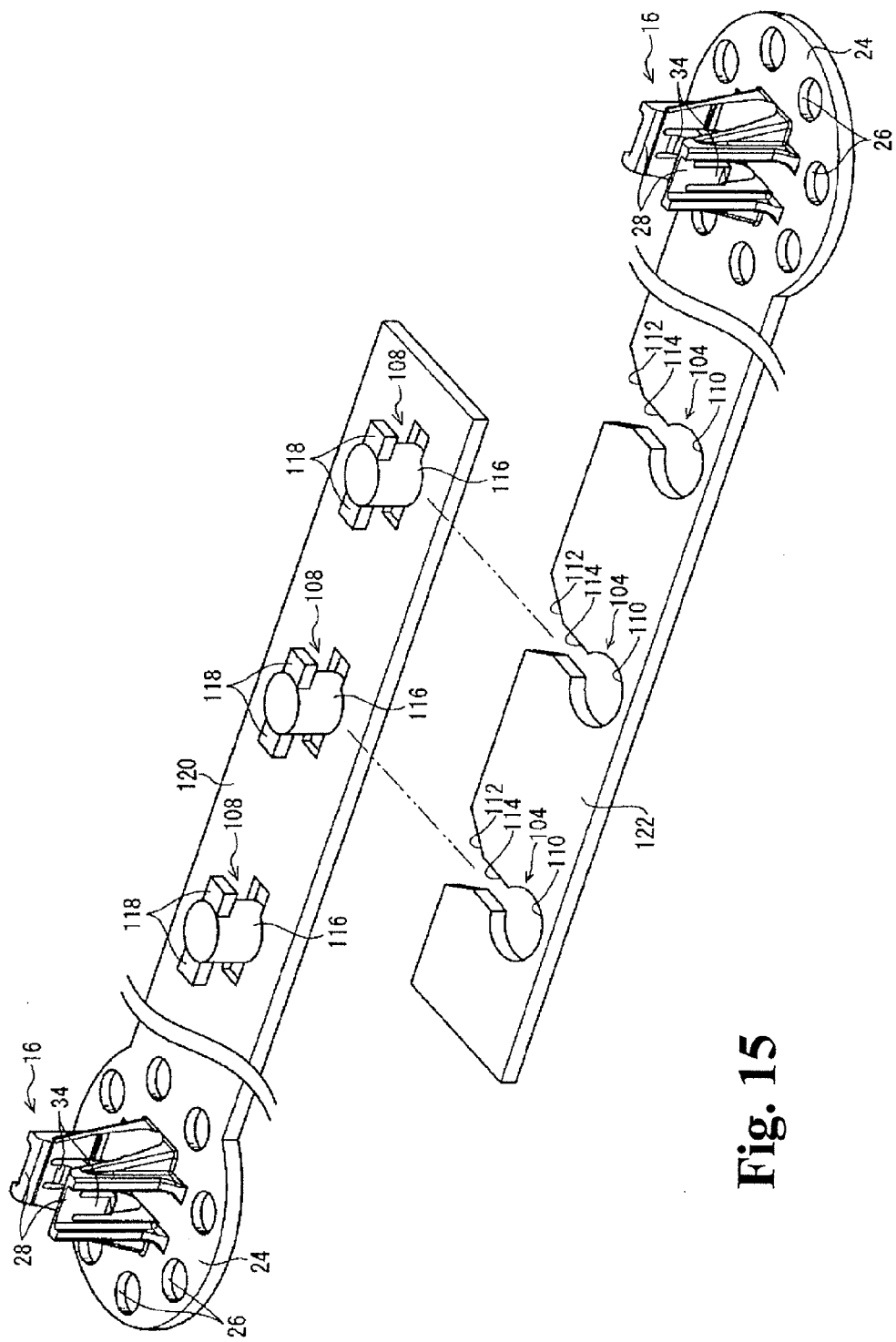
FIG. 15 is a side view illustrating a seventh modified example of the connected clip according to the present embodiment.

Furthermore, at least two (here, three) bosses 116 are provided on another end side of the band-form member three or more connecting parts 104 are provided on another end side of the band-form member 122, as illustrated in FIG. 15. By this, rotation of the band-form member 122 against the band-form member 120 can be prevented in a state in which the plurality of connecting parts 104 and the plurality of bosses 116 are connected. In addition, a distance of separation between the clip 16 provided on one end of the band-form member 120 and the clip 16 provided on the one end of the band-form member 122 can be changed by changing the positions of the connecting parts 104 connected to the bosses 116.

By configurations such as above, clips 16 are integrally molded with an automobile seat 10 when the automobile seat 10 is molded, but the operability is more favorable in the case when the connected clip 45 having integrated a plurality of clips 16 with band-form members, or the like, is inserted into a mold (not illustrated) for molding the automobile seat 10, compared with the case when the clips 16 are inserted one by one into the mold.

Figure 16:
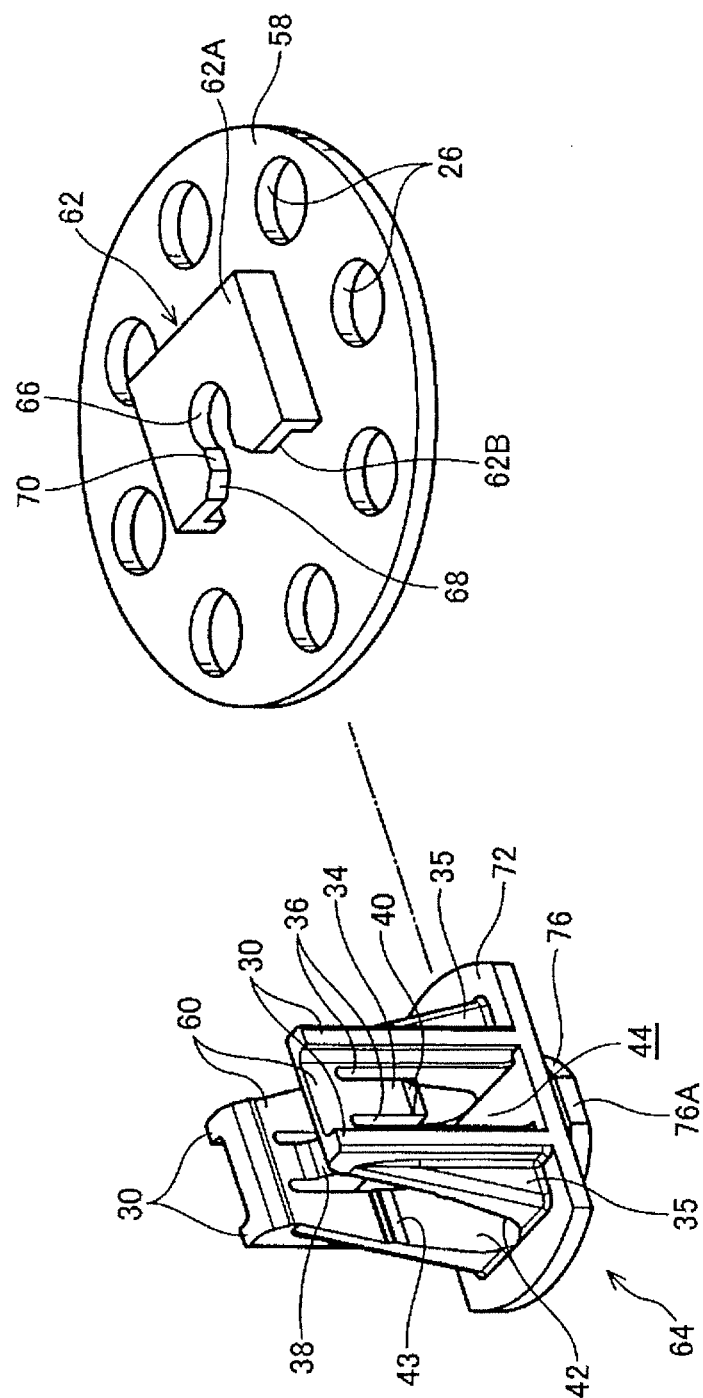
FIG. 16 is a perspective view illustrating a first modified example of the clip according to the present embodiment.
Figure 17A:
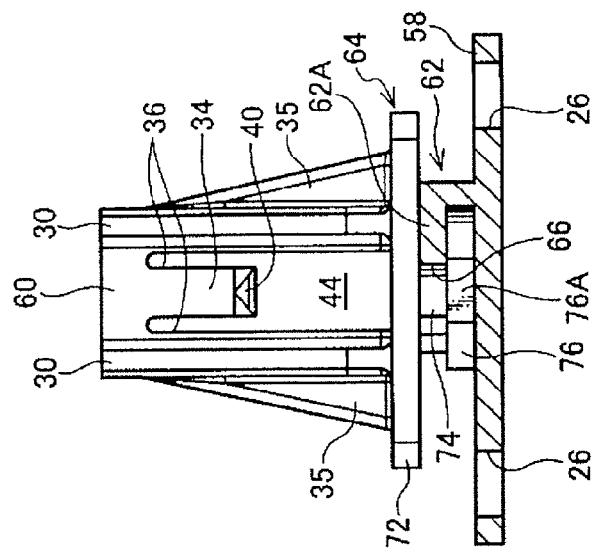

(2) Also, in the present embodiment, the base part 24 of the clip 16 and the wall part 28 are formed as one body, but it is not always necessary that they be one body. For example, a wall part 60 side may be integrated with a base part 58 side by coupling. As one example, a coupling-receiving part 62 may be provided on the base part 58 side, a coupling part 64 may be provided on the wall part 60 side, and the coupling part 64 may be coupled with the coupling-receiving part 62, as illustrated in FIGS. 16 and 17A.

Specifically, a gap is provided between the base part 58 and an upper wall 62A of the box-form coupling-receiving part 62 provided in the center portion of the base part 58. Also, one side wall of the coupling-receiving part 62 serves as an opening 62B, and a circular part 66 is formed inside the inner recess of the upper wall 62A. An entrance 68 of the circular part 66 is made with a wide width, and a guide portion 70 guiding from the entrance 68 to the circular part 66 is made with a narrow width.

Figure 17B:
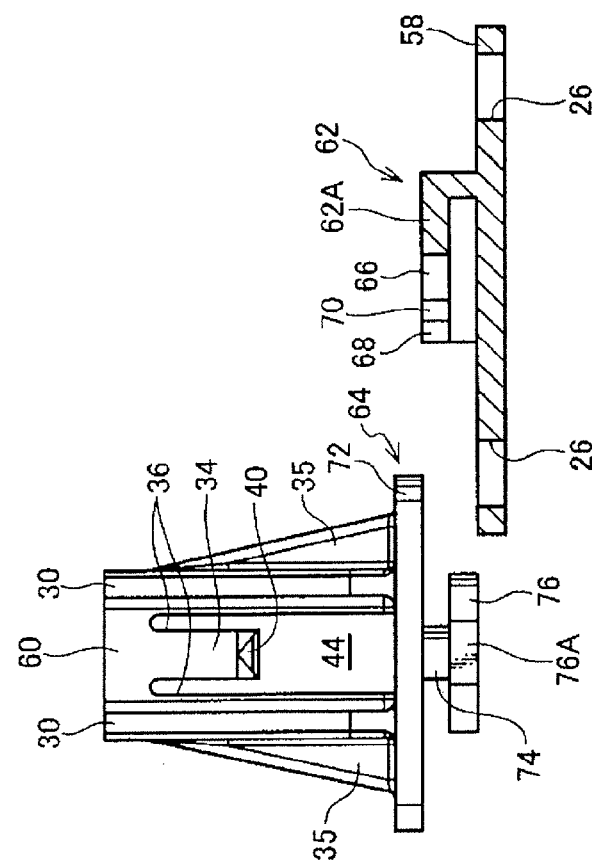

Meanwhile, the coupling part 64 provided on the side of the wall part 60 has a platform 72, and a pair of wall parts 60 is placed upright from the center portion of the platform. Also, the platform 72 is surface-contactable with an upper face of the upper wall 62A of the coupling-receiving part 62 as illustrated in FIG. 17B.

A neck part 74 hangs down from a lower face of the platform 72, and a flange part 76 is provided on a lower end of the neck part 74. The length of the neck part 74 is made roughly the same as the thickness of the upper wall 62A of the coupling-receiving part 62. The flange part 76 is moved sliding along an upper face of the base part 58, and the flange part 76 is inserted between the upper wall 62A and the base part 57, upon which the neck part 74 is coupled with the circular part 66.

A chamfered portion 76A is formed on the outer perimeter portion of the flange part 76, the chamfered portion 76A contacts an inner wall of the coupling-receiving part in a state being inserted between the upper wall 62A and the base part 58, so that the platform 72 is prevented from rotating.

Also, the external dimensions of the neck part 74 are made somewhat smaller than the circular part 66 and roughly the same as the width dimension of the guide portion 70. By this, the neck part 74 snaps in when passing through the guide portion 70, so that the wall part 60 and the base part 58 are integrated in a manner so that the neck part 74 does not easily come out from the circular part 66. Thus, the base part 58 side and the wall part 60 side are formed separately, whereby the universality is increased because it is possible to change only the wall part 60 side to fit the shape of the suspender.

Here, the coupling-receiving part 62 was provided on the base part 58 side, the coupling part 64 was provided on the wall part 60 side, and the flange part 76 of the coupling part 64 is moved sliding along the upper face of the base part 58 to be coupled with the coupling-receiving part 62. However, the invention is not limited to this because it is sufficient as long as the base part side 58 and the wall part 60 side are mutually coupled.

Figure 18:
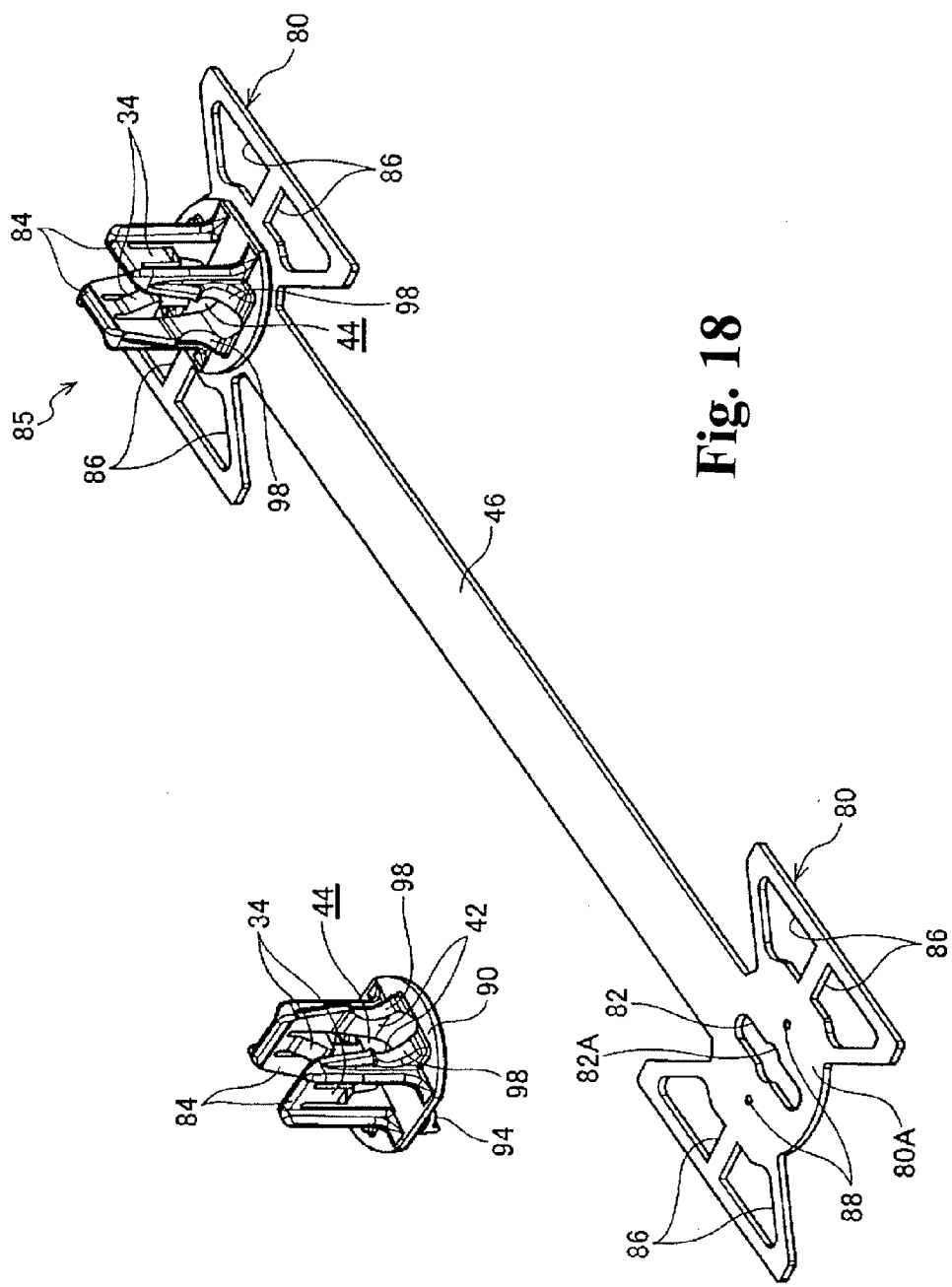
FIG. 18 is a perspective view illustrating a second modified example of the clip according to the present embodiment, illustrating the state before the wall part side is coupled on one base part side.

For example, the configuration may be such that the base part side and the wall part side are mutually coupled by rotating the wall part side against the base part side. Specifically, a long hole (part coupled with) 82 is formed in a center portion 80A on a base part 80 side, and a shaft bearing part 82A having a larger diameter than the width dimension of the long hole 82 is formed in the center portion of the long hole 82, as illustrated in FIG. 18. Meanwhile, a coupling part (to be described) having roughly the same shape as the long hole 82 and being insertable into the long hole 82 is formed on a wall part 84 side.

Here, in the previously described embodiment, the base part 24 or 58 of the clip 16 is made as a disk form as illustrated in FIG. 1 or FIG. 16, but the shape of the base part is not particularly limited, and another example is given here of a clip 85 having a shape including a roughly circular center part 80A in the middle and roughly triangular-shaped base parts 80 having the center part 80A side as vertices, as illustrated in FIG. 18. Also, roughly trapezoidal hole parts 86, into which material of the automobile seat 10 is inserted, are formed on the base parts 80 of the clip 85.

Figure 19:
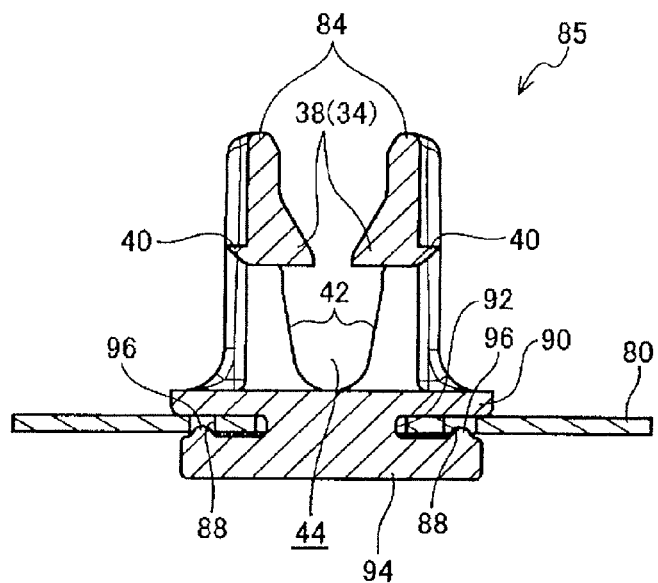
FIG. 19 is a cross-sectional view illustrating a second modified example of the clip according to the present embodiment.

Also, positioning holes 88 are formed on both sides of the width direction of the long hole 82 in the center part 80A of the base part 80 with the long hole 82 in between. Meanwhile, a roughly disk-form platform 90 is provided on the wall part 84 side, and a pair of wall parts 84 is placed upright from the center portion of the platform 90, as illustrated in FIGS. 18 and 19. Also, a lower face of the platform 90 is made surface contactable with an upper face of the base part 80.

A round-columnar shaft part 92 hangs down from the lower face of the platform 90, and is coupleable with the shaft bearing part 82A. A coupling part 94 is provided on a lower end of the shaft part 92, and the coupling part 94 is formed to extend in the radial direction of the shaft part 92. Protruding parts 96 coupleable with the positioning holes 88 are placed pointing upward on an upper face (platform 90 side) on both end sides of the coupling part 94. Also, a gap is provided between the upper face of the coupling part 94 and the lower face of the platform 90, and the gap is formed to roughly the same thickness as that of the base part 80.

Figure 20:
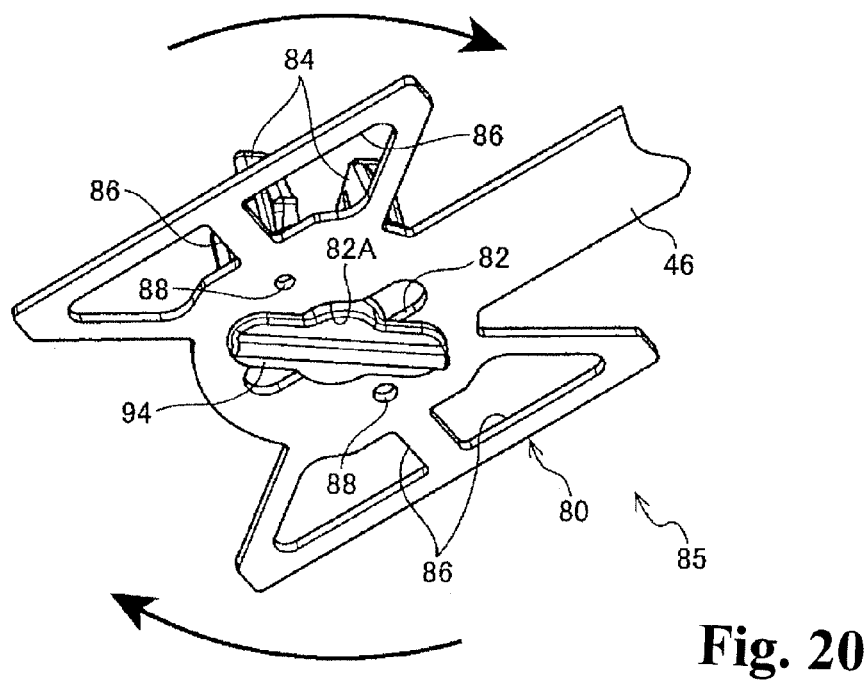
FIG. 20 is a perspective view, viewed from diagonally downward, illustrating a second modified example of the clip according to the present embodiment.
Figure 21:
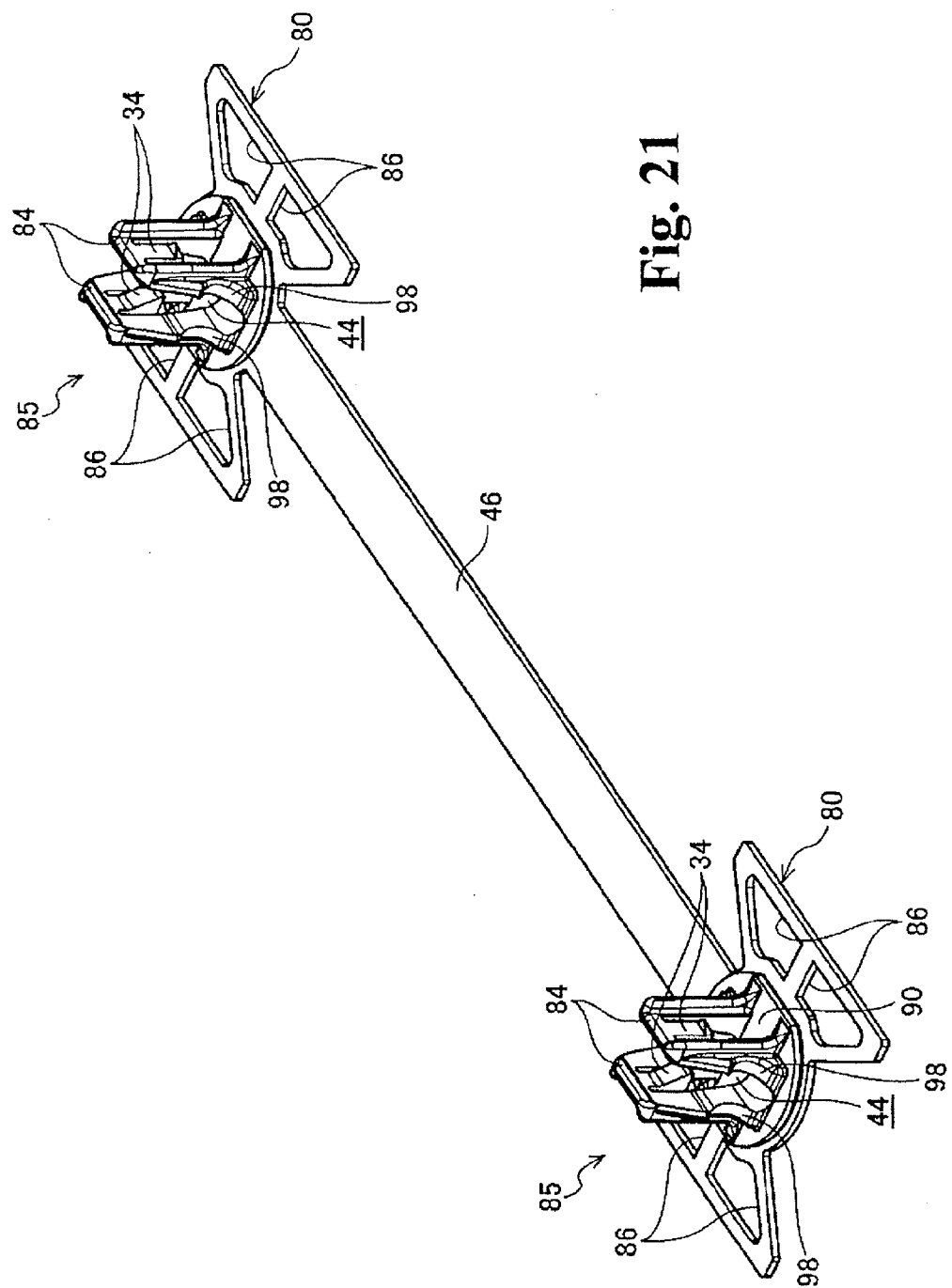
FIG. 21 is a perspective view illustrating a second modified example of the clip according to the present embodiment, illustrating the state in which the wall part side is coupled to the base part side.

As illustrated in FIG. 18, the coupling part 94 is inserted inside the long hole 82, aligning the shape of the coupling part 94 and the shape of the long hole 82, and then the wall part 84 side is rotated in the direction of the arrow indicated in FIG. 20, upon which the shaft part 92 rotates inside the shaft bearing part 82A, and the protruding parts 96 couple with the positioning holes 88 (see FIGS. 19 and 21). By this, the wall part 84 side is prevented from rotating against the base part 80 side.

Here, because the gap between the upper face of the coupling part 94 and the lower face of the platform 90 is formed to roughly the same thickness as that of the base part 80, when the wall part 84 side is rotated after the coupling part 94 is inserted inside the long hole 82, both end sides of the coupling part 94 are pressed, and are elastically deformed downward, by the lower face of the base part 80 by way of the protruding parts 96, and return when the protruding parts 96 reach the positioning holes 88. At this time, the clip is obtained, and the completion of coupling of the wall part 84 with the base part 80 can be determined objectively.

Meanwhile, a leading end face of the wall part 84 may be made as an R shape so that corners are rounded. By this, tearing of the seat cover 18 can be prevented when the wall part 84 rubs the seat cover 18 (see FIG. 3).

Figure 22A:
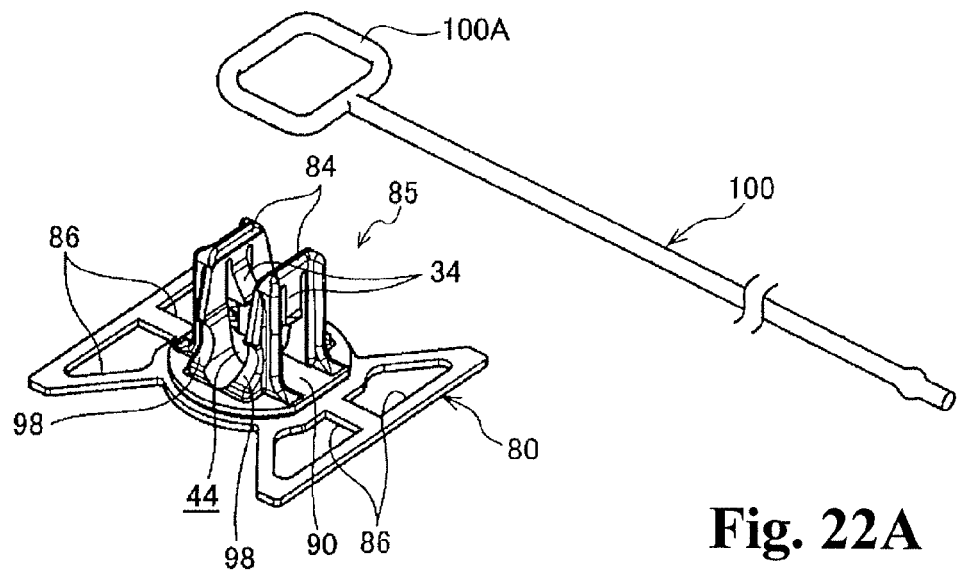

Also, arc-form recessed parts 98 may be formed respectively on the sides of the bases on the end faces on both sides of the wall part 84. Normally, a suspender 22 made with resin, having a triangular shape in section, is provided on the leading end of a cloth strap 20 (see FIG. 1), but instead of this suspender 22, a suspender 100 having a frame part 100A on one end may be used, for example, as illustrated in FIG. 22A.

Figure 22B:
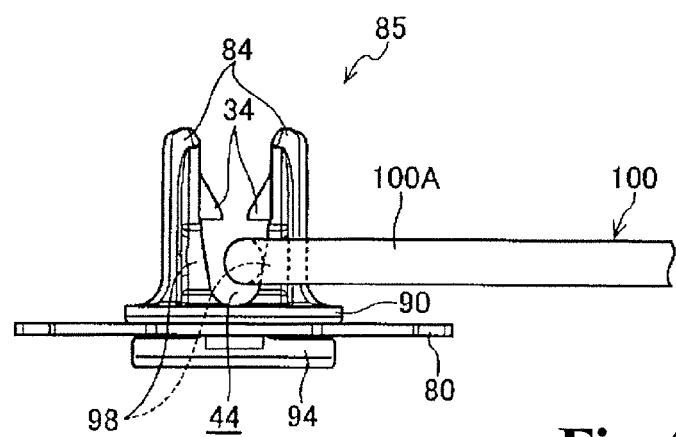

The suspender 100 is formed as a cylindrical rubber band, and the line diameter is made as a size insertable between wall part 84 and wall part 84. The width of the frame part 100A is formed somewhat narrower than the dimensions between the recessed parts 98 formed on the end faces on both sides of the wall part 84. As illustrated, in FIG. 22B, the frame part 100A is inserted in one wall part 84, and the frame part 100A is locked in the recessed parts 98 of the wall part 84. By this, movement of the suspender 100 against the wall part 84 is restricted. In other words, the suspender 100 is locked on the clip 85.

Incidentally, as previously described, the configuration is such that material (foamed material of polyurethane, or the like) of the automobile seat 10 is inserted in the base part 24 of the clip 16 as illustrated in FIG. 1, and in the base part 80 of the clip 85 as illustrated in FIG. 18, but there is a concern that the clip 16 or 85 may be removed from the foamed material in the case when some extent of removing load is applied to the suspender 22 (see FIG. 1).

Figure 23:
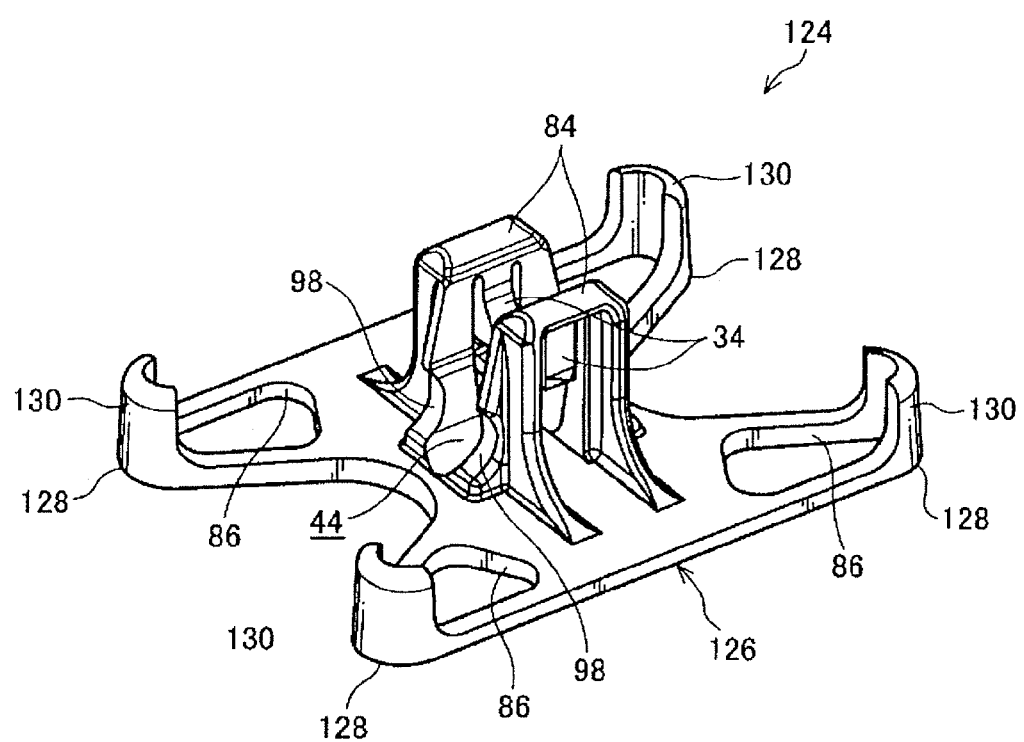
FIG. 23 is a perspective view illustrating a third modified example of the clip according to the present embodiment.

Therefore, projecting parts 130 may be placed upright respectively on vertices 128 of the base part 126 of the clip 124 as illustrated in FIG. 23. Thus, the projecting parts 130 are provided on the base part 126, whereby the area of contact with the foamed material can be increased, and a load for separation can be increased. Also, the base part 126 is elastically deformed following deformation of the clip 124 and the foamed material during separation of the clip 124 from the foamed material, and separation of the clip 124 from the foamed material can be prevented by an anchoring effect of the projecting parts 130 against the direction of removal of the suspender 22.

The base part 126 of the clip 124 and the wall part 84 are formed as one body here, but it is obvious that the base part 126 side and the wall part 84 side may be integrated by coupling. Also, only the clip 124 is illustrated here, but a configuration in which a plurality of clips 124 is connected with a band-form member 46 (see FIG. 18), or the like, also is applicable.

Furthermore, although not illustrated, projecting parts 130 may be provided on an outer edge side of a disk-form base part 24 (see FIG. 1). However, in this case, because a plurality of round holes 26 (see FIG. 1) is formed along the circumferential direction on the outer edge side of the base part 24, suitable changes can be made, such as arranging the round holes 26 and the projecting parts 130 alternately along the circumferential direction, or arranging the projecting parts 130 between round hole 26 and round hole 26.

What is claimed is:

1. A clip, comprising:
 a board-form base part adapted to be held on a foamed material;
 a pair of wall parts erected on said base part and facing each other, each of the pair of wall parts including two side portions, each having a protruding part formed on an inner face thereof and extending horizontally in a width direction thereof, and a middle portion arranged between the two side portions;
 locking parts, each being elastically deformably attached to each of the middle portions and spaced from each of the two side portions to form slits therebetween; and
 locking claws, each projecting from an inner face of said locking part and being adapted to lock an anchoring member attached to a seat cover covering said foamed material and inserted between said wall parts,
 wherein the middle portion connects upper portions of the two side portions, and each of the locking parts extends downwardly from the middle portion of each of the pair of wall parts, and
 an end face of each of the locking claws and two side portions of each of the pair of wall parts define a space, and the slits are communicated with the space and extend toward the middle portion to space each of the locking parts from each of the two side portions.

2. A clip according to claim 1, wherein the inner faces of said side portions of the pair of wall parts and end faces of said locking claws define a space thereinside, and the space is adapted to have a shape same as an external shape of said anchoring member.

3. A clip according to claim 1, wherein each of the locking parts includes a pointed part on an outer face of said locking part.

4. A clip according to claim 1, wherein each of the protruding parts aligns with positions of end faces of said locking claws.

5. A clip according to claim 1, wherein the base part includes at least two hole parts to which the foamed material enters.

6. A clip according to claim 1, wherein each of the side portions of the pair of wall parts includes an R part provided on a base portion thereof and having a thickness to become gradually wide toward the base portion thereof.

7. A connected clip, comprising:
 a board-form member or a linear-form member; and
 the clip according to claim 1, provided on the board-form member or the linear-form member.

8. A connected clip according to claim 7, wherein said clip is provided on one end of said board-form member or said linear-form member, and a connecting part to mutually connect to another board-form member or linear-form member is provided on another end of the board-form member or linear-form member.

9. A seat cover covering structure, comprising:
 the clip according to claim 1, embedded in the foamed material;
 the anchoring member to be inserted between the wall parts of said clip, and having a shape same as a shape of the space formed with the inner faces of said side portions of the pair of wall parts and end faces of said locking claws; and
 a connecting member attached to the anchoring member and adapted to connect said seat cover with said anchoring member.

10. A seat cover covering structure, comprising:
 the connected clip according to claim 9, embedded in the foamed material;
 the anchoring member to be inserted between the wall parts of said clip, and having a shape same as a shape of a space formed with the inner faces of said side portions of the pair of wall parts and end faces of said locking claws; and
 a connecting member attached to the anchoring member and adapted to connect said seat cover with said anchoring member.

11. A seat cover covering structure according to claim 9, wherein said anchoring member and said connecting member are integrally molded with resin.

12. A seat cover covering structure according to claim 10, wherein said anchoring member and said connecting member are integrally molded with resin.

13. A clip according to claim 1, wherein each of the side portions of the pair of wall parts includes a reinforced rib extending in an erected direction thereof, and triangular rib extending outwardly in a width direction thereof to have a width becoming gradually wide toward a base portion thereof.

14. A seat cover covering structure according to claim 9, wherein the end faces of the locking claws and the protruding parts hold the anchoring member when the anchoring member is inserted between the pair of wall parts.

15. A clip according to claim 1, wherein each of the protruding parts is arranged at a position same as a height of an end face of each of the locking claws, and has a length shorter than that of each of the locking claws in a protruding direction.

\* \* \* \* \*